United States Patent [19]

Morishima et al.

[11] 4,097,212

[45] Jun. 27, 1978

[54] PELLETIZER

[75] Inventors: Yukimas Morishima, Kure; Minoru Yoshida; Hideo Masuda, both of Hiroshima, all of Japan

[73] Assignee: The Japan Steel Works, Ltd., Tokyo, Japan

[21] Appl. No.: 641,157

[22] Filed: Dec. 15, 1975

[30] Foreign Application Priority Data

Jul. 25, 1975 Japan .................................. 50-90303

[51] Int. Cl.² .............................................. B29C 17/14
[52] U.S. Cl. ........................... 425/313; 425/DIG. 230
[58] Field of Search ...................... 425/6, 67, 311, 313, 425/382, 464, 378 S, 379 S, DIG. 230, 310, 376, 11

[56] References Cited

U.S. PATENT DOCUMENTS

| | | | |
|---|---|---|---|
| 693,750 | 2/1902 | Smith | 425/382 |
| 1,281,592 | 10/1918 | Laskey | 425/378 |
| 1,302,484 | 4/1919 | Stratton et al. | 425/378 |
| 2,647,474 | 8/1953 | Popich | 425/310 X |
| 3,103,700 | 8/1963 | Halverson et al. | 425/311 |
| 3,452,394 | 7/1960 | McNeal | 425/379 |
| 3,564,650 | 2/1971 | Irving | 425/310 X |
| 3,874,835 | 4/1975 | Rossiter et al. | 425/313 |

Primary Examiner—Robert L. Spicer
Attorney, Agent, or Firm—Amster & Rothstein

[57] ABSTRACT

A pelletizer of the type of an underwater cutter has its die surface composed of a surface of rotation, e.g., a right circular cylinder, a frustum of a cone, etc., whereby plastic resin materials fed from an extruder under pressure to the outside of the die wall are forced to extrude through a number of die nozzles drilled in the wall of the die to be cut into pellets by a cutter which is rotating in front of the die surface and provided with a plurality of cutter blades the outer edge of each of which is disposed in parallel with the die surface leaving a definite, uniform gap therefrom.

1 Claim, 5 Drawing Figures

PELLETIZER

BACKGROUND OF THE INVENTION

The present invention relates to a pelletizer and more particularly to a pelletizer of the type of an underwater cutter.

It has been well-known that a pelletizer for plastic resin materials can be divided into several types according to the state in which the plastic resin materials are cut, i.e., (1) an underwater cutting;
(2) a cutting in air;
(3) a strand cutting; and
(4) a sheet cutting.

It has also been well-known that among these types of pelletizers a pelletizer of the type of an underwater cutting has usually been adopted on account of its larger processing capacity.

It has recently been inclined to widely adopt a pelletizer having a larger processing capacity with the object of reducing the product price, eliminating manpower required for the pelletizing process.

When a typical configuration of a conventional pelletizer of this type is represented, as shown in FIGS. 4 and 5 of the attached drawings, it has, as hitherto having been publicly known in the art, generally a plane constitution wherein melted plastic resin meterials fed from an extruder 30 are extruded through a number of die nozzles 1 in the form of strands to be cut into pieces, each having a definite length, i.e., pellets by a cutter 2 which is rotating by means of drive means 17' and belt means 18' under the water in front of die nozzles 1, the cut pieces being rapidly cooled by the flowing water to be conveyed to a connected pipe line, not shown, accompanied by the water. Thus, since the pelletizing of plastic resin materials has hitherto been practiced by such a die having a plane construction, in order to accommodate such a die to process a larger quantity of the materials it is inevitably necessary to arrange a number of die nozzles circumferential to the die, resulting in an increase of the diameter A of the die, which in turn necessiates to thicken the dimension T of the die plate to resist the total plastic resin material pressure that increases as diameter A increases, but this apparently imparts a larger resistance to the plastic resin materials extruding through die nozzles 1. Consequently, the processing capacity is subject to limitation due to pressure loss of the extruding plastic resin materials resulting from the increase of the resistance to which the plastic resin materials is subjected at the time of their extruding through die nozzles 1 so that the amount of the resin to be processed is naturally limited. On the other hand, the processing capacity of an extruder has recently been augmented to such a degree as it is proportional to the cube of its screw diameter due to the improvement of the screw design, whereas the processing capacity of a pelletizer associated with the extruder can be increased in proportion to only the square of the die diameter owing to the plane configuration, which results in an enormous increase of the diameter A of the die, which in turn not only causes an increase in the overall weight of the pelletizer as well as its price, but also requires, in operation, a high skill in the pelletizing procedure. In addition, since the outer surface of the die coming into contact with the flowing water becomes necessarily large as the diameter A of the die increases the uniform heating of the die is made so difficult that the quality of the products is affected. Thus, in the pelletizer on a larger scale the die has hitherto been a matter of great concern.

SUMMARY OF THE INVENTION

It is an object of the present invention to provide a pelletizer of the type of an underwater cutter which can eliminate all of the defects inherent to the conventional pelletizer having a plane configuration die as mentioned above.

It is another object of the present invention to provide a pelletizer of the type of an underwater cutter wherein the dimension of its die is made thin to reduce the resistance to which the plastic resin materials are subject when they are extruded through its nozzles so that the processing capacity is not subjected to a substantial restriction.

It is a further object of the present invention to provide a pelletizer of the type of an underwater cutter which allows to increase the processing capacity in proportion to the cube of the diameter of its die.

It is still a further object of the present invention to provide a pelletizer of the type of an underwater cutter which can provide an increase of the processing capacity without necessitating a substantial increase of its dimension and weight.

It is also an object of the present invention to provide a pelletizer of the type of an underwater cutter in which uniform heating of its die is insured so that pellets of the plastic resin materials having an excellent and uniform quality can be produced.

According to the present invention a pelletizer of the type of an underwater cutter is provided which comprises a die having an inner surface in the form of a surface of revolution, e.g., a frustum of a cone, a regular circular cylinder, a housing adapted to be connected to an extruder and surrounding the die to leave an annular passage for plastic resin materials to be pelletized between its inner surface and the outside of the die, a plurality of die nozzles drilled through the wall of the die radially at its axis so as to connect the annular passage for plastic resin materials with the inner surface of the die, and a cutter which is adapted to be rotated in front of the inner surface of the die and provided with a plurality of cutting blades, whereby the outer edge of each of the cutting blades is disposed in parallel with the inner surface of the die leaving a definite, uniform gap therefrom.

In one aspect of the pelletizer according to the present invention heating jackets are provided a wall of the housing above and below the annular passage for plastic resin materials.

In another aspect, nozzle heating jackets are drilled axially in the die wall between the die nozzles so as to be in communication with the heating jackets at both ends.

BRIEF DESCRIPTION OF THE DRAWINGS

These and other objects of the present invention will become more readily apparent upon reading the following description taken in connection with the accompanying drawings wherein is set forth by way of illustrations and examples a single embodiment of the present invention.

DESCRIPTION OF THE PREFERRED EMBODIMENT

Figure 1:
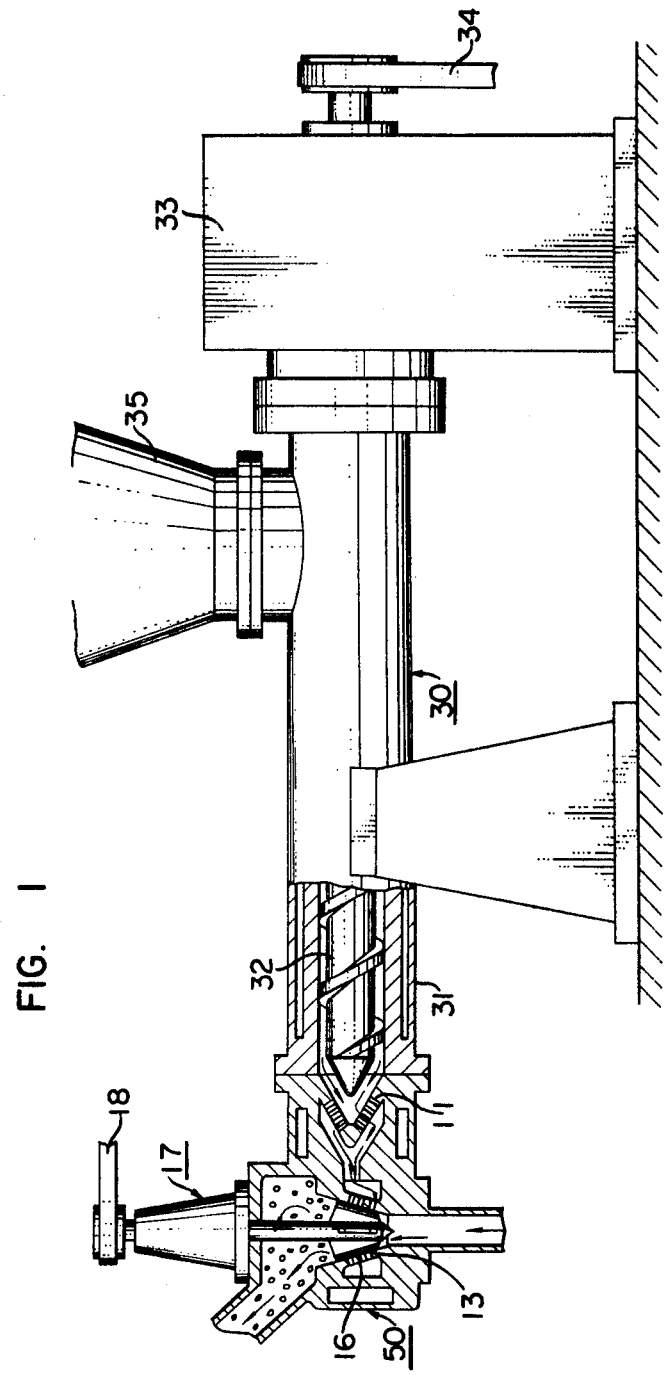
FIG. 1 shows a partial sectional view of an embodiment of the present invention together with an extruder incorporated therewith.

Referring now to FIG. 1 of the drawings, there is shown an extruder 30 comprising a cylinder 31 disposed horizontally and a screw 32 rotatably mounted in cylinder 31 to be rotated through reduction gears 33 by a pulley and belt means 34, whereby plastic resin materials fed from a hopper 35 are molten-kneaded within cylinder 31 by screw 32 to be fed into a pelletizer 50 according to the present invention through a breaker plate 11 and secured to its entrance portion. Pelletizer 50 is adapted to be fixedly secured to the forward end of cylinder 31 of extruder 30 by any suitable means, e.g., flanges and fastening bolts, not shown, in such a manner that its axis is disposed vertically and intersects perpendicularly to the axis of cylinder 31.

Figure 2:
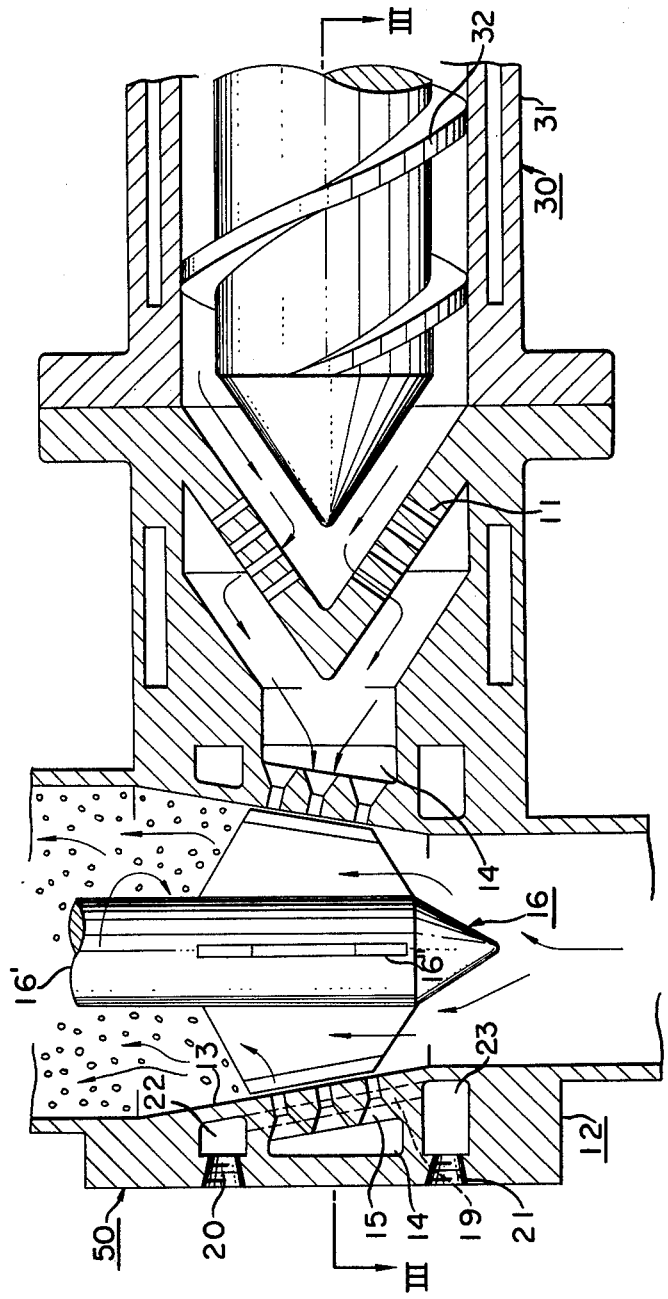
FIG. 2 shows a longitudinal sectional view of a principal portion of the embodiment of the present invention shown in FIG. 1.
Figure 3:
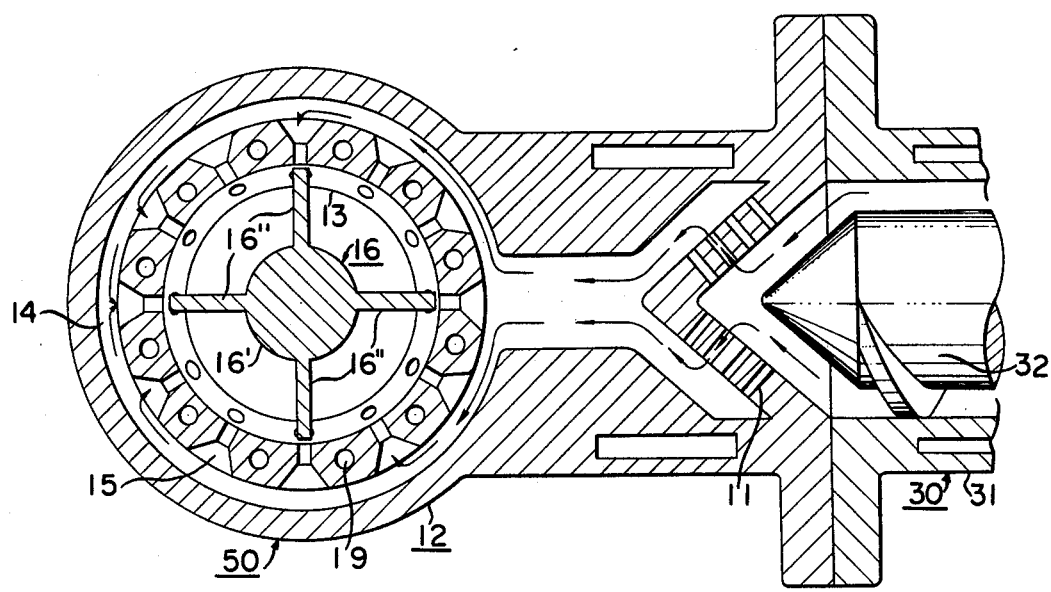
FIG. 3 shows a sectional view of the embodiment of FIG. 1 taken along the line III—III of FIG. 2.
Figure 4:
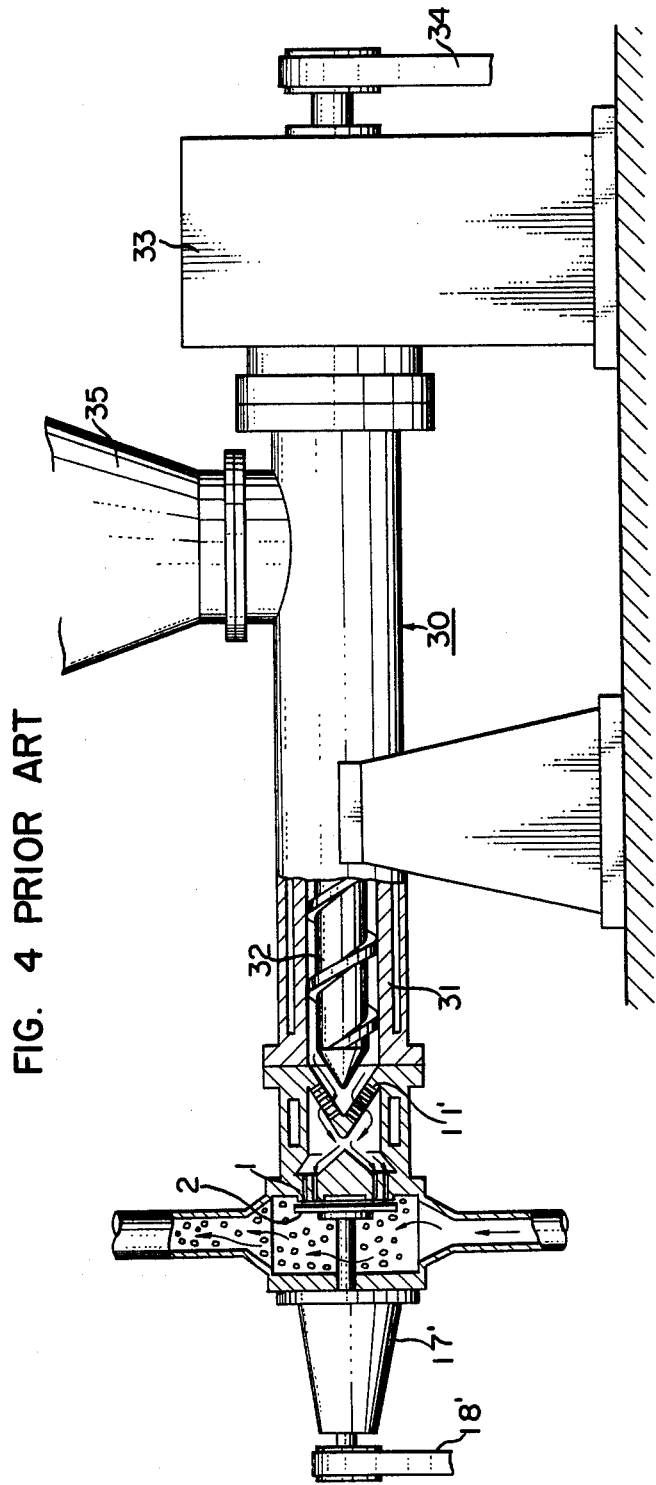
FIG. 4 shows a partial sectional view of a conventional pelletizer together with an extruder similar to that shown in FIG. 1.
Figure 5:
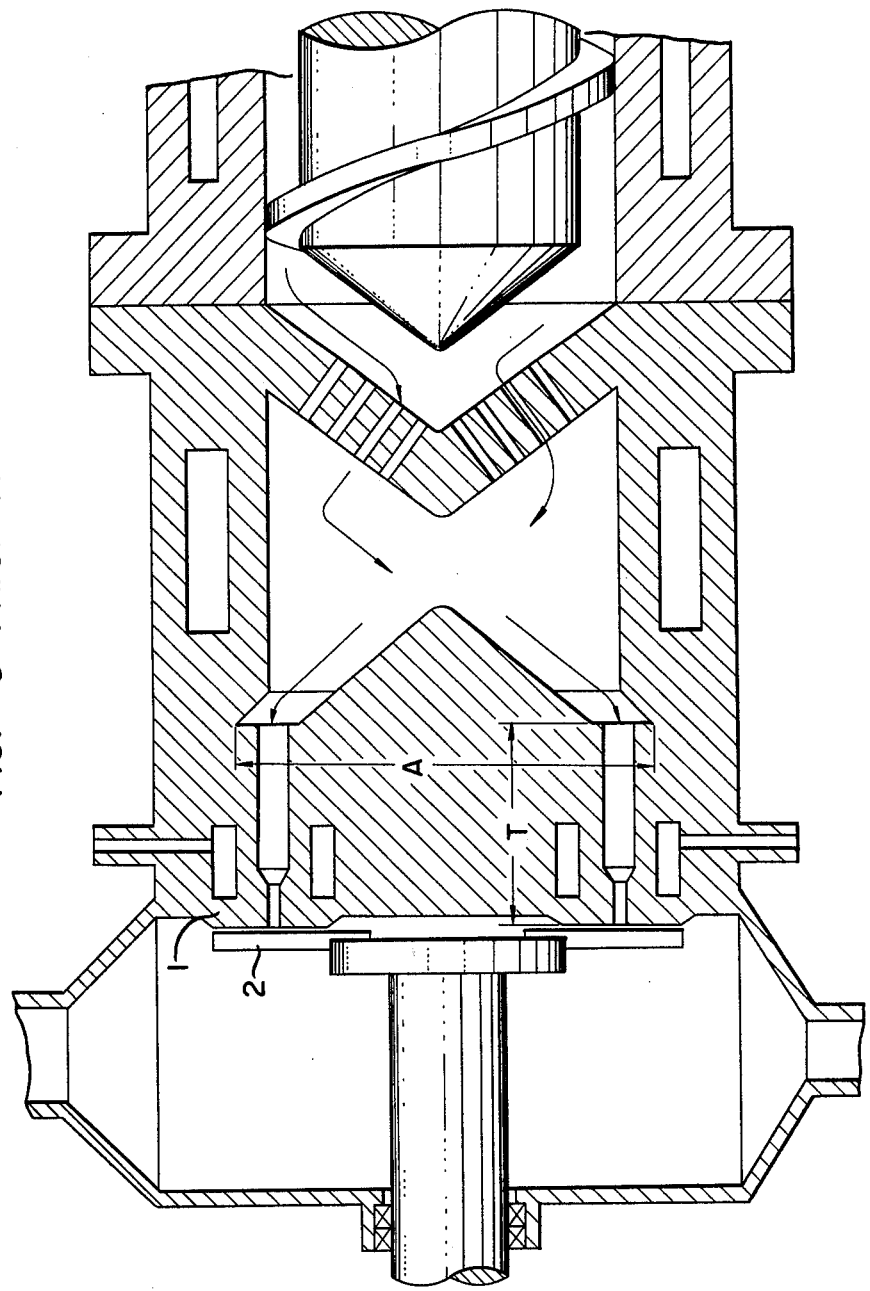
FIG. 5 shows a longitudinal sectional view of the teaching of the typical conventional pelletizer shown in FIG. 4.

Pelletizer 50 comprises, as shown in FIGS. 1 to 3, a housing 12 having generally a hollow cylindrical shape with its inner surface being formed as a die surface 13 and a cutter 16 disposed coaxially within housing 12 so as to rotate in front of die surface 13. Die surface 13 forms a surface of revolution with its axis of revolution coinciding with the axis of housing 12 such as a right circular cylinder or a truncated cone. The wall of housing 12 has an annular plastic resin material flow passage 14 (thereinafter referred to simply as "annular flow passage") drilled axially between its outer surface and die surface 13 so as to leave, on the outer side, a housing wall and, on the inner side a die wall, each having a definite thickness, whereby a hole is made in the housing wall surrounding annular flow passage 14 at a portion where housing 12 faces cylinder 31 of the extruder so that annular passage 14 is in communication with cylinder 31 for the purpose of supplying the molten-kneaded resin materials from cylinder 31 through breaker plate 11 into annular flow pasage 14. At this point, it will be appreciated that the housing wall and the die wall may be manufactured as separate members to be detached and connected together by any suitable means with the provision of sealing means therebetween in order to prevent the leakage of the molten-kneaded plastic resin from annular flow passage 14. This allows an easy and precise machining and assembly of pelletizer 50.

The die wall is drilled with a number of die nozzles 15 extending radially to die surface 13 providing a passage for the molten-kneaded plastic resin materials from annular flow passage 14 into the inside of die surface 13. Each of die nozzles 15 has a shape and a dimension depending on those of the pellets to be extruded in accordance with the teaching of the conventional pelletizer and the number of die nozzles 15 are determined so that their total areas equal the quantity of the pellets to be extruded per unit time. Further die nozzles 15 are preferably disposed in one or more generally horizontal planes spaced vertically with a definite distance being left therebetween, whereby die nozzles 15 are disposed in said horizontal planes, respectively, and circumferentially at equal distances. In addition to annular flow passage 14 the wall of housing 12 is drilled with annular upper and lower heating jackets 22 and 23 which are disposed respectively above and below annular flow passage 14 separated from it by partitions, and also a number of nozzle heating jackets 19 connecting upper and lower heating jackets 22 and 23 are drilled axially through the die wall between the respective longitudinal rows of die nozzles 15. Upper and lower heating jackets 22 and 23 are provided with heating medium inlet and outlet orifices 20 and 21, respectively, which are drilled through the wall of housing 12 so as to be in communication with them.

Cutter 16 comprises a driving shaft 16' disposed axially within housing 12 and a number of blades 16" connected to driving shaft 16' longitudinally at regular circumferential intervals so that each of their outer edges confronts die surface 13 with a definite uniform gap being left therefrom. Driving shaft 16' is driven and connected to a driving means 17 which is mounted to housing 12 at any desired position quite similar to the driving means in a conventional pelletizer and adapted to be driven through a pulley and belt means 18.

In operation, the pelletizer connected to the forward end of cylinder 31 of extruder 30 has the inside of housing 12 cooled through cooling water along die surface 13 passing in one direction, e.g., upwards as suggested in FIGS. 1 and 2, and cutter 16 is rotated through driving means 17 under the water at a given rotary speed in front of die nozzles 15. At the same time the heating medium is supplied from inlet orifice 20 into upper heating jacket 17 and from thence fed through nozzle heating jackets 19 into lower heating jacket 18, the heating medium being discharged therefrom through outlet orifice 21.

Upon rotation of screw 32 of extruder 30 the molten-kneaded plastic resin materials are fed under a definite pressure through breaker plate 11 into annular flow passage 14 of housing 12 of pelletizer 50 so that they are urged to be extruded through die nozzles 15 as strands into the water flowing along die surface 13 and upon discharging from die nozzles 15 onto die surface 13 the strands are cooled by the cooling water flowing upwards along it to be solidified and cut into pellets by blades 16" of cutter 16 which are rotating in front of die surface 13 with definite, uniform small gaps being left therefrom, whereby the pellets cut are conveyed away from die surface 13 accompanied by the flowing cooling water. The dimension and shape of each of the pellets are principally determined by the pressure of the molten-kneaded plastic resin materials in annular flow passage 14 of housing 12, the shape as well as dimension of each of die nozzles 15, the rotational speed of cutter 16, and the dimension of the gap between die surface 13 and the edges of respective blades 16". In this case, it will be appreciated that if the shape of die surface 13 has the form of a truncated cone as in the embodiment shown the precise adjustment of the gap between die surface 13 and the edges of respective blades 16" is made easy.

It will also be noted that, according to the present invention, since the die surface has a shape of a surface of revolution such as a frustum of a cone so as to apply pressure to the plastic resin circumferentially from the outside of the die wall having the similar configuration, the thickness of the die wall can be made much thinner than that of a conventional die having a plane constitution, which in turn decreases the resistance of the plastic resin to which die nozzles 15 are subjected when it passes through them. Further, when the quantity of the plastic resin to be extruded is increased, it may be easily accommodated by increasing the number of the horizontal planes in which die nozzles 15 lie, leaving the thickness of the die wall substantially the same as before. This means that the processing capacity of a pelletizer according to the present invention can be made in proportion to the cube of the inner diameter of die surface 13. It is also one of the advantageous features of the pelletizer according to the present invention that upper and lower annular heating jackets 17, 18 are provided in the wall above and below annular flow passage 14 together with nozzle heating jackets 19 connecting them, because such a configuration of the heating jackets allows the uniform heating of the die even if steam is used as the heating medium in virtue of the fact that the drain generated in them can be perfectly vented from them.

While a single preferred embodiment of the present invention has been described and illustrated herein it will be understood that many modifications in shape and size may be made while utilizing the teaching of the invention.

We claim:

1. A pelletizer of the type having an underwater cutter comprising a horizontally located extruder unit having a housing within which a rotatable extruder screw is mounted with its axis extending longitudinally thereof to force material strands therealong;

a vertically located cutter unit including a rotatable cutter mounted therewithin and having its axis extending at right angles to said extruder unit axis, said cutter having driving means connected therewith and located directly thereabove so that said cutter is rotatable to cut the strands into pellets to be directed vertically upwards;

said cutter having a plurality of blades the outer edges of which are each shaped as a truncated cone extending upwardly and outwardly to provide an inclination of said outer edges with respect to said cutter unit axis;

said cutter unit including a housing surrounding said cutter, said cutter housing comprising a housing wall and a die wall with said housing wall being connected to an end of said extruder unit housing;

said die wall defining a chamber surrounding said cutter blade edges and spaced a predetermined uniform distance therefrom, said die wall extending upwardly and outwardly to form a first chamber area located upwardly from said blades that is of a larger size than a second chamber area located to surround said blades, said die wall formed to have the same inclination as said blade edge inclination;

a drive shaft connected to said cutter and extending upwardly therefrom, said cutter and drive shaft movable upwardly into said first chamber area to prevent clogging of pellets and said cutter and drive shaft movable downwardly into said second chamber area to regulate the size of the gap between said blades and said die wall;

a plurality of die nozzles extending generally horizontally through said die wall to open into said second chamber area, said nozzles spaced vertically and provided to extrude the material therethrough from said extruder unit into said cutter unit and heating means provided in said die wall comprising a pair of jackets spaced respectively above and below adjacent to said outer edges of said cutter, said jackets connected to flow passages with a heating medium passing therethrough.

* * * * *

UNITED STATES PATENT AND TRADEMARK OFFICE
CERTIFICATE OF CORRECTION

PATENT NO. : 4,097,212
DATED : June 27, 1978
INVENTOR(S) : Yukimasha Morishima, Minoru Yoshida, Hideo Masuda It is certified that error appears in the above-identified patent and that said Letters Patent are hereby corrected as shown below:

The name of the first inventor is to be corrected to read as follows:

"YUKIMASHA MORISHIMA"

Signed and Sealed this

Sixth Day of March 1979

[SEAL]

Attest:

RUTH C. MASON
Attesting Officer

DONALD W. BANNER
Commissioner of Patents and Trademarks